United States Patent Office 3,632,577
Patented Jan. 4, 1972

3,632,577
5-NITROFURYL DERIVATIVES
William Hoyle, Bramhall, and Gordon Peter Roberts, Altrincham, England, assignors to Geigy Chemical Corporation, Ardsley, N.Y.
No Drawing. Filed Dec. 16, 1968, Ser. No. 784,242
Int. Cl. C07d 85/38
U.S. Cl. 260—240 A  6 Claims

ABSTRACT OF THE DISCLOSURE 5-nitro-2-furfurylideneamino-oxazolidinones are useful antimicrobial agents; compositions containing these compounds and methods for the treatment of microbial infections, particularly urinary tract infections, and for the protection of organic material susceptible to microbial attack, employing these compounds; an illustrative embodiment is 5 - (2 - formyloxyethoxymethyl) - 3 - (5 - nitrofurfurylideneamino)-2-oxazolidinone.

DETAILED DISCLOSURE

The present invention relates to nitrofuryl derivatives having valuable pharmacological properties and, in particular to 5-nitro-2-furfurylideneamino-oxazolidinones exhibiting antimicrobial activity. It further relates to compositions containing these compounds as well as to methods for the treatment of mammals suffering from microbial infections, particularly of urinary tract infections, by administering to said mammals an effective amount of a compound according to the invention. The invention also provides methods for protecting organic material susceptible to microbial attack by treating said material with an effective amount of a compound according to the invention. Further the invention provides an animal feedstuff composition containing a compound of the invention.

More particularly, the present invention relates to 5-nitro-2-furfurylideneamino-oxazolidinones having the Formula I

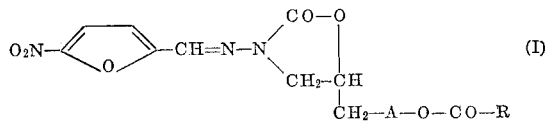

wherein A is an alkylene group containing two or three carbon atoms, and R is hydrogen, an aliphatic hydrocarbon group containing from one to nine carbon atoms, a cycloaliphatic hydrocarbon group containing from three to nine carbon atoms, or an alkoxyalkyl group containing from two to nine carbon atoms, the total number of carbon atoms comprised in the groups A and R together not exceeding eleven.

The group A may represent a propylene or isopropylene group, but is preferably ethylene.

The group R may be, for example, an alkyl group having from one to nine carbon atoms; an alkenyl group having from two to nine carbon atoms; or a cycloalkyl group having from three to nine, and preferably from five to seven carbon atoms in the carbocyclic ring.

If the group R is an alkyl group, the alkyl may be, for example, methyl, ethyl, n-propyl, isopropyl, n-butyl, isobutyl, secondary butyl, tertiary butyl, n-pentyl, isopentyl, n-hexyl, n-octyl, iso-octyl or n-nonyl.

If the group R is an alkenyl group, this may be, for example, allyl, 2-methylallyl, but-2-enyl (crotyl), but-3-enyl, pent-1-enyl, pent-2-enyl, hex-1-enyl, hexadienyl or nonenyl.

If the group R is a cycloalkyl group the cycloalkyl preferably contains from three to nine carbon atoms in the carbocyclic ring and may be, for example, cyclopropyl, cyclobutyl, cyclopentyl, cyclohexyl, cycloheptyl, cyclooctyl, or cyclononyl.

If the group R is an alkoxyalkyl group, this may be, for example, methoxymethyl, methoxyethyl, methoxy-n-propyl, methoxyisopropyl, methoxy-n-butyl, methoxytertiarybutyl, methoxyhexyl, methoxyoctyl, ethoxymethyl, ethoxyethyl, isopropoxymethyl, tertiarybutoxymethyl, octyloxymethyl or butoxypentyl group.

A preferred subclass of compounds are the compounds falling under Formula I wherein A is an ethylene group and R is hydrogen or an alkyl group having from one to five carbon atoms.

Preferred members of this subclass are, on account of their antimicrobial activity, 5-(2-formyloxyethoxymethyl) - 3 - (5 - nitrofurfurylidene - amino) - oxazolidinone, 5 - (2 - acetoxyethoxymethyl) - 3 - (5 - nitrofurfurylideneamino) - 2 - oxazolidinone and 5 - (2 - butyryloxyethoxymethyl) - 3 - (5 - nitrofurfurylideneamino) - 2-oxazolidinone.

The compounds of Formula I are prepared by nitrating a compound of Formula II

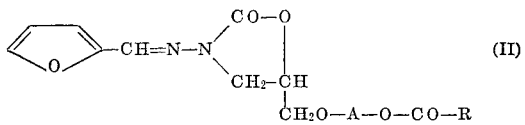

wherein A and R have their previous significance.

The nitration may be carried out with nitric acid under conditions conventional in nitrating substituted furyl derivatives, for instance, by reacting in the presence of a water-binding agent. The water-binding agent may be, for example, sulphuric acid, but is preferably acetic anhydride. If desired, a proportion of acetic acid may be present in the reaction mixture. The nitration is preferably carried out at a temperature not exceeding 15° C. using concentrated or fuming nitric acid. The reaction may be carried out, for instance, by adding a mixture of concentrated or fuming nitric acid, acetic acid and acetic anhydride slowly to a suspension or solution of the oxazolidinone of Formula II in a mixture of acetic acid and acetic anhydride while maintaining the temperature at from 5° to 15° C., preferably about 10° C. If desired, the compound of Formula II may be produced during the nitration by reacting the corresponding compound having the Formula IIII

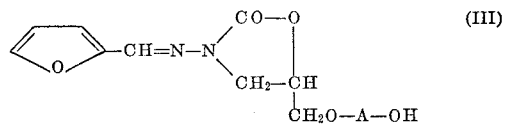

with an acylating agent containing the group —CO—R, wherein A and R have their previous significance.

Examples of acylating agents which may be used in the process of the invention include carboxylic acids, carboxylic anhydrides and mixed anhydrides, and acid chlorides. Preferably, however, the acylating agent is acetic anhydride or oher carboxylic anhydride.

The present invention also provides a second process of producing a 5-nitro-2-furfurylideneamino-oxazolidinone of Formula I, which comprises reacting a compound having the Formula IV

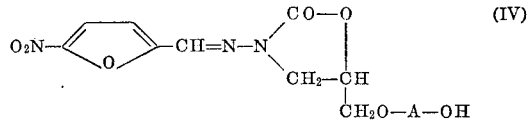

with the corresponding acylating agent containing the structure —CO—R, wherein A and R have their previous significance.

The reaction of the compound of Formula IV with the acylating agent may be carried out by heating the reactants together, if desired, in the presence of a basic condensing agent or a dehydrating agent; the basic condensation agent may be, for instance, trimethylamine, triethylamine, pyridine, dimethylaniline or other tertiary organic base. The acylating agent may be, for example, a carboxylic acid, carboxylic anhydride or mixed anhydride, or acid chloride, but is preferably acetic anhydride or other carboxylic anhydride.

Compounds of Formula IV are novel and they may be prepared, for example, by condensing 5-nitro-2-furaldehyde or a functional derivative thereof with the corresponding oxazolidinone having the Formula V

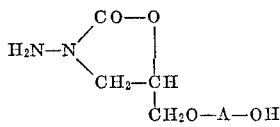

or salt thereof with an organic or inorganic acid, wherein A has its previous significance.

If a salt of the oxazolidinone of Formula V is used in the process of the invention, it may be, for instance, a salt of the oxazolidinone with hydrochloric acid, hydrobromic acid, sulphuric acid, phosphoric acid, methanesulphonic acid, ethanedisulphonic acid, acetic acid, trichloroacetic acid, oxalic acid, succinic acid, maleic acid, fumaric acid, malic acid, tartaric acid, citric acid or mandelic acid.

The compounds of the present invention having Formula I have valuable antimicrobial properties, and in particular have antibacterial, anthelminthic, coccidiostatic, trypanocidal and antimalarial activity of value in human or veterinary medicine. The compounds are particularly valuable in the treatment of infections of the intestinal and urinary tracts. The compounds may also be used to protect a high molecular weight hydrophobic or other organic material susceptible to bacterial or other microbial deterioration by contacting the organic material with, impregnating or otherwise treating with, the compounds. The compounds also find application as growth-promoting additives to animal feedstuffs.

The antimicrobial activity of the compounds of the invention can be demonstrated in various in vitro and in vivo tests.

As an example of the use of the compounds of the present invention, the use of 5-(2-acetoxy-ethoxymethyl)-3-(5 - nitrofurfurylideneamino)-2-oxazolidinone in experimental cystopyelitis in rats will be described. The test used is in essence that described by G. Marca, M. Preti and D. Della Bella, Boll. Chimicofarm 105, 313–317 (1966).

Rats were infected with *Proteus mirabilis* K 564 by introducing a stainless steel cylinder having an inner volume of about 1.56 mm.³ filled with a suspension of the bacteria of McFarland 1 into the urinary bladder. 5-(2-acetoxyethoxymethyl) - 3 - (5 - nitrofurfurylideneamino)-2-oxazolidinone is administered orally through an esophagal sound in an amount of five times 50 mg./kg. (suspended in carboxymethylcellulose) according to the following time-table:

(1) 4 hours after infection
(2) Morning of the first day after infection
(3) Evening of the first day after infection
(4) Morning of the second day after infection
(5) Evening of the second day after infection.

On the third day, the animals were sacrificed, the steel cylinder taken out under sterile conditions and the number of germs determined and compared with controls having been infected in the same manner, but having not obtained the test compound. A very pronounced reduction of germs was observed in the test group.

A definite reduction of the number of germs was also observed if the other preferred members of the compounds of the invention were administered.

The toxicity of the compounds of the invention is of favorable low order on oral administration.

For their intended internal use, for example for the treatment of urinary tract infections, the compounds of the invention are administered orally in daily dosages of from about 1 to about 100 mg./kg., preferably from about 1 to about 40 mg./kg. Advantageously, the compounds are administered in form of compositions.

Accordingly, the invention also provides a therapeutic composition comprising an antimicrobially effective amount of a 5-nitro-2-furfurylideneamino-oxazolidinone of Formula I and a pharmacologically acceptable solid carried or liquid diluent.

The pharmaceutical compositions according to the invention contain at least one compound of Formula I as active substance together with a conventional pharmaceutical carrier. The type of carrier actually used depends to a great extent on the intended application; for external use, for example in disinfecting healthy skin; disinfecting wounds and in treating dermatoses and affections of the mucous membranes caused by bacteria, ointments, powders and tinctures are used in particular. The ointment bases may be anhydrous, for instance they can consist of mixtures of wool fat and soft paraffin or they can consist of aqueous emulsions in which the active substance is suspended. Suitable carriers for powders are, for instance rice starch and other starches; the bulk weight of the carriers may be made lighter, if desired, for example by adding highly dispersed silicic acid, or may be made heavier by adding talcum. The tinctures may contain at least one active ingredient of the Formula I in aqueous ethanol, in particular 45% to 75% ethanol, to which 10% to 20% of glycerol may be added, if desired. Solutions prepared from polyethylene glycol and other conventional solubility promoters, and also optionally, from emulsifying agents, may be used with particular advantage in disinfecting healthy skin. The content of active ingredient in pharmaceutical compositions for external application is preferably in the range of from 0.1% to 5%.

Gargles or concentrates for their preparation, and tablet for slow dissolution in the mouth, are suitable for the disinfection of the mouth and throat. The former are preferably prepared from alcoholic solutions containing 1% to 5% of active substance to which glycerol or flavourings may be added. Lozenges, that is solid dosage units, preferably have a relatively high content of sugar or similar substances and a relatively low content of active substance, for instance 0.2% to 20% by weight, as well as the usual conventional additives such as binding agents and flavourings.

Solid dosage units, in particular tablets, dragées (sugar coated tablets) and capsules, are convenient for use in intestinal disinfection and for the oral treatment of urinary tract infections. These units preferably contain from 10% to 90% of the compound of the general Formula I to enable the administration of daily doses of from 0.1 to 2.5 grams to adults or of suitably reduced doses to children to be made. Tablets and dragée cores are produced by combining the compounds of the general Formula I with solid, pulverulent carriers such as lactose, saccharose, sorbitol, maize starch, potato starch or amylopectin, cellulose derivatives or gelatines, preferably with the addition of lubricants such as magnesium or calcium stearate or polyethylene glycols of suitable molecular weight. Dragée cores may then be coated, for example with concentrated sugar solutions which can also contain gum arabic, talcum and/or titanium dioxide, or they may be coated with a lacquer dissolved in volatile organic solvents or mixture of solvents. Dyestuffs can be added to these coatings, for instance to differentiate between varying dosages. Soft gelatine capsules and other closed capsules consist, for example, of a mixture of gelatines and glycerol and may contain, for example, mixtures of the compound of Formula I with polyethylene glycol. Hard gelatine capsules contain, for example, granulates of an active substance with solid pulverulent carriers, for instance lactose saccharose, sorbitol mannitol, starches (such as potato starch, maize starch or amylopectin), cellulose derivatives of gelatines, and magnesium stearate or stearic acid.

In all forms for administration compounds or the general Formula I can be present as sole active ingredients or they can also be combined with other known pharmacologically active, and especially antibacterially and/or antimycotically or other antimicrobially active substances, for example to broaden the range of application. They can be combined for example, with 5,7-dichloro-2-methyl-8-quinolinol or other derivatives of 8-quinolinol, with sulfamerazine or sulfafurazole or other derivatives of sulfanilamide, with chloramphenicol or tetracycline or other antibiotics, with 3,4′,5 - tribromosalicylanilide or other halogenated salicylanilides, with halogenated carbanilides, with halogenated benzoxazoles or benzoxazolones, with polychlorohydroxy-diphenylmethanes, with halogen-dihydroxy-diphenyl sulphides, with 4,4′-dichloro-2-hydroxy-diphenylether or 2′,4,4′-trichloro-2-hydroxydiphenylether or other polyhalogenhydroxy-diphenylethers, or with bactericidal quaternary compounds or with certain dithiocarbamic acid derivatives such as tetramethylthiuram disulphide. Also, carriers which themselves have favourable pharmacological properties may be used, for instance sulphur as a powder base or zinc stearate as a component of ointment bases.

The invention also provides a method of protecting an organic material susceptible to bacterial or other microbial attack which comprises treating the material with a 5-nitro-2-furfurylideneamino-oxazolidinone of Formula I. The organic material may be, for instance, a natural or synthetic polymeric material, a proteinaceous or carbohydrate substance or a natural synthetic fibre or textile material formed therefrom.

The invention also provides an animal feedstuff composition containing a 5-nitro-2-furfurylideneamino-oxazolidinone of Formula I in an amount sufficient to promote the growth of the animal fed with the composition.

The following examples further illustrate the present invention. Percentages are expressed by weight unless otherwise stated.

EXAMPLE 1

(A) A mixture of 80 grams of 1-hydrazino-2-hydroxy-3-(2-hydroxyethoxy)-propane, 78.3 grams of diethyl carbonate, 80 grams of methanol and 5.43 grams of sodium methoxide was heated gradually over 3 hours to 120° C. during which period methanol and ethanol distilled over. The residue was acidified with dilute acetic acid and treated with 30 grams of 5-nitro-2-furaldehyde. The crystalline product produced was collected and dried.

The product was 5-(2-hydroxyethoxymethyl)-3-(5-nitrofurfurylideneamino)-2-oxazolidinone, having melting point 141° C. after recrystallisation from aqueous methanol.

(B) A mixture of 6 grams of 5-(2-hydroxyethoxymethyl)-3-(5 - nitrofurfurylideneamino)-2-oxazolidinone and 10 grams of acetic anhydride was heated under reflux for one hour. After cooling, the crystalline product which was obtained was collected and dried.

The product was 5-(2-acetoxyethoxymethyl)-3-(5-nitrofurfurylideneamino)-2-oxazolidinone, having melting point 118° C.

EXAMPLE 2

The procedure described in Example 1 was carried out using propionic anhydride instead of acetic anhydride, the reaction conditions being otherwise essentially the same.

The product was 3-(5-nitrofurfurylideneamino)-5-(2-propionyloxyethoxymethyl)-2-oxazolidinone, having melting point 107° C.

EXAMPLE 3

The procedure described in Example 1 was carried out using butyric anhydride instead of acetic anhydride, the reaction conditions being otherwise essentially the same.

The product was 5-(2-butyryloxy-ethoxymethyl)-3-(5-nitrofurfurylideneamino)-2-oxazolidinone having melting point 68° C.

EXAMPLE 4

The procedure described in Example 1 was carried out using isobutyric anhydride instead of acetic anhydride, the reaction conditions being otherwise essentially the same.

The product was 5-(2-isobutyryloxyethoxymethyl)-3-(5-nitrofurfurylideneamino)-2-oxazolidinone having melting point 69° C.

EXAMPLE 5

The procedure described in Example 1 was carried out using valeric anhydride instead of acetic anhydride, the reaction conditions being otherwise essentially the same.

The product was 3-(5-nitrofurfurylideneamino)-5-(2-valeryloxyethoxymethyl)-2-oxazolidinone.

EXAMPLE 6

The procedure described in Example 1 was carried out using hexanoic anhydride instead of acetic anhydride, the reaction conditions being otherwise essentially the same.

The product was 5-(2-hexanoyloxyethoxymethyl)-3-(5-nitrofurfurylideneamino)-2-oxazolidinone having melting point 49° C.

EXAMPLE 7

The procedure described in Example 1 was carried out using 99% formic acid instead of acetic anhydride, the reaction conditions being otherwise essentially the same.

The product was 5-(2-formyloxyethoxymethyl)-3-(5-nitrofurfurylideneamino)-2-oxazolidinone having melting point 107° C.

EXAMPLE 8

The procedure described in Example 1 was carried out using crotonic anhydride instead of acetic anhydride, the reaction conditions being otherwise essentially the same.

The product was 5-(2-crotonyloxyethoxymethyl)-3-(5-nitrofurfurylideneamino)-2-oxazolidinone.

EXAMPLE 9

The procedure described in Example 1 was carried out using methoxyacetic anhydride instead of acetic anhydride, the reaction conditions being otherwise essentially the same.

The product was 5-(2-methoxyacetoxyethoxymethyl)-3-(5-nitrofurfurylideneamino)-2-oxazolidinone.

EXAMPLE 10

To a stirred mixture of 15 grams of 5-(2-hydroxyethoxy methyl) - 3-(5-nitrofurfurylideneamino)-2-oxazalidinone in 50 grams of anhydrous pyridine was added slowly 7.4 grams of cyclohexanoyl chloride. After standing the reaction mixture was poured into water. The yellow solid which precipitated was collected and dried.

The product was 5 - (2 - cyclohexanoyloxyethoxymethyl) - 3 - (5 - nitrofurfurylideneamino) - 2-oxazolidinone, having melting point 146° C.

EXAMPLE 11

(A) The procedure described in Example 1A was carried out using furaldehyde instead of 5-nitro-2-furaldehyde, the reaction conditions being otherwise essentially the same.

The intermediate product thus prepared was 3-furfurylideneamino-5-(2-hydroxyethoxymethyl)-2-oxazolidinone.

(B) The procedure described in Example 1B was carried out using the 3-furfurylideneamino-5-(2-hydroxyethoxymethyl) - 2 - oxazolidinone, the reaction conditions being otherwise essentially the same.

The further intermediate product thus prepared was 5-(2-acetoxyethoxymethyl)-3-furfurylideneamino-2-oxazolidinone.

(C) To a mixture of 10.3 grams of acetic anhydride and 1.9 grams of concentrated nitric acid was added in portions 2.9 grams of 5-(2-acetoxyethoxymethyl)-3-furfurylideneamino-2-oxazolidinone while cooling. After allowing the reaction mixture to stand, the resulting yellow solid was collected and recrystallised from ethanol.

The product was 5 - (2-acetoxyethoxymethyl)-3-(5-nitrofurfurylideneamino)-2-oxazolidinone, having melting point 118° C. and being identical with the product of Example 1.

EXAMPLE 12

The procedure described in Example 1 was carried out using ethoxyacetic anhydride instead of acetic anhydride, the reaction conditions being otherwise essentially the same.

The product was 5-(2-ethoxyacetoxyethoxymethyl)-3-(5-nitrofurfurylideneamino)-2-oxazolidinone.

EXAMPLE 13

The procedure described in Example 1 was carried out using octyloxyacetic anhydride instead of acetic anhydride, the reaction conditions being otherwise essentially the same.

The product was 5-(2-octyloxyacetoxyethoxymethyl)-3-(5-nitrofurfurylideneamino)-2-oxazolidinone.

EXAMPLE 14

The procedure described in Example 1 was carried out using dec-9-enoic anhydride instead of acetic anhydride, the reaction conditions being otherwise essentially the same.

The product was 5-(2-dec-9'-enoyloxyethoxymethyl)-3-(5-nitrofurfurylideneamino)-2-oxazolidinone.

EXAMPLE 15

The procedure described in Example 11B was carried out using formic acid instead of acetic anhydride, the reaction conditions being otherwise essentially the same. The intermediate product thus prepared was 5-(2-formyloxyethoxymethyl) - 3 - furfurylideneamino - 2 - oxazolidinone.

The procedure described in Example 11C was then carried out using the 5-(2-formyloxyethoxymethyl)-3-furfurylideneamino - 2 - oxazolidinone, instead of 5-(2-acetoxyethoxymethyl) - 3 - furfurylideneamino - 2 - oxazolidinone, the reaction conditions being otherwise essentially the same.

The product was 5-(2-formyloxyethoxymethyl)-3-(5-nitrofurfurylideneamino)-2-oxazolidinone, having melting point 107° C. and being identical with the product of Example 7.

EXAMPLE 16

The procedure described in Example 11B was carried out using butyric anhydride instead of acetic anhydride, the reaction conditions being otherwise essentially the same. The intermediate product thus prepared was 5-(2-butyryloxyethoxymethyl) - 3 - furfurylideneamino-2-oxazolidinone.

The procedure described in Example 11C was then carried out using the 5-(2-butyryloxyethoxymethyl)-3-furfurylideneamino - 2 - oxazolidinone, instead of 5-(2-acetoxyethoxymethyl) - 3 - furfurylideneamino - 2 - oxazolidinone, the reaction conditions being otherwise essentially the same.

The product was 5-(2-butyryloxyethoxymethyl)-3-(5-nitrofurfurylideneamino)-2-oxazolidinone, having melting point 68° C. and being identical with the product of Example 3.

EXAMPLE 17

Preparation of tablets 100 g. of 5-(2-formyloxyethoxymethyl)-3-(5-nitrofurfurylideneamino)-2-oxazolidinone are mixed with 60.0 g. of maize starch and 35.0 g. of lactose, the mixture is moistened with a solution of 5.0 g. of gelatin and 3.0 g. of glycerol in 70.0 g. of water and granulated through a sieve. The granulate is mixed with a mixture of 15.0 g. of talcum, 10.0 g. of maize starch and 2.0 g. of magnesium stearate. The resulting mixture is pressed into 1,000 tablets each containing 100 mg. of active substance. If desired, the tablets can be grooved for better adaptation of the dosage.

EXAMPLE 18

Preparation of dragées

Composition:                    For 1,000 dragées, g.

(I)

| | |
|---|---|
| 5-(2-acetoxyethoxymethyl) - 3 - (5-nitrofurfurylideneamino)-2-oxazolidinone | 100.0 |
| Maize starch | 27.0 |
| Gelatin | 8.0 |

(II)

| | |
|---|---|
| Glycerol | 2.0 |
| Distilled water q.s. ad 100 ml. | |
| Maize starch | 10.0 |

(III)

| | |
|---|---|
| Talcum | 7.0 |
| Magnesium stearate | 1.0 |
| | 155.0 |

(IV)

White dragée coating.

| | |
|---|---|
| Shellac | 2.0 |
| Sugar | 50.0 |
| Talcum | 38.0 |
| Gum arabic | 7.4 |
| Colloidal silicon dioxide | 2.2 |
| Titanium dioxide | 0.4 |

Composition I is granulated in the heat with composition II through a sieve of 1.2 mm. mesh diameter. The dried granulate is mixed with composition III and the resulting mixture is pressed into 1,000 dragée cores. These are then coated with composition IV and dried. The dragées obtained weigh 255.0 mg. and contain 100 mg. of active substance.

EXAMPLE 19

Preparation of a syrup

Composition:                                For 1 liter, g.

| | |
|---|---|
| 5-(2-butyryloxyethoxymethyl) - 3 - (5-nitrofurfurylideneamino)-2-oxazolidinone | 100.0 |
| Colloidal silicon dioxide | 13.0 |
| p-Hydroxybenzoic acid methyl ester | 1.4 |
| p-Hydroxybenzoic acid propyl ester | 0.6 |
| Citric acid | 1.0 |
| Sodium cyclamate | 5.0 |
| Distilled water | 610.0 |
| Glycerol | 100.0 |
| Sodium carboxymethyl cellulose | 4.0 |
| Sugar | 320.0 |
| | 1155.0 |

The active substance and the colloidal silicon dioxide are passed through a sieve of 1.2 mm. mesh diameter (I).

The p-hydroxybenzoic acid esters, the citric acid and the sodium cyclamate are dissolved in the given amount of boiling distilled water; the glycerol is then added to this solution (II). The sodium carboxymethyl cellulose and the sugar are thoroughly mixed (III).

Composition III is then added at 75° C. to solution II under stirring until complete dissolution of III. The viscous, slightly turbid liquid is cooled to room temperature, filtered, if necessary, and mixed with composition I. Water is added to the resulting mixture up to the prescribed weight of 1,155.0 g. and the syrup obtained is homogenized.

What is claimed is:

1. A compound of the formula:

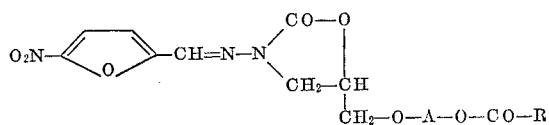

wherein

A is alkylene having two to three carbon atoms, and
R is hydrogen, alkyl of from 1 to 9 carbon atoms, alkenyl of from 2 to 9 carbon atoms, cycloalkyl of from 3 to 9 carbon atoms, or alkoxyalkyl of from 2 to 9 carbon atoms, the total number of carbon atoms comprised in the groups A and R together not exceeding 11.

2. A compound according to claim 1, wherein A is an ethylene group and R is hydrogen or an alkyl group having from one to five carbon atoms.

3. A compound according to claim 1, wherein A is ethylene and R is hydrogen.

4. A compound according to claim 1, wherein A is ethylene and R is methyl.

5. A compound according to claim 1, wherein A is ethylene and R is propyl.

6. A compound of the formula

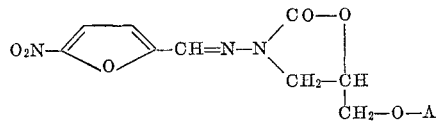

wherein A is an alkylene group having two or three carbon atoms.

References Cited
FOREIGN PATENTS
1,528,366   4/1968   France _____ 260—240 A JOHN D. RANDOLPH, Primary Examiner U.S. Cl. X.R.

99—2; 424—272

UNITED STATES PATENT OFFICE
CASE 4-2743/MA 1328

CERTIFICATE OF CORRECTION

Patent No. 3,632,577    Dated January 4, 1972

Inventor(s) WILLIAM HOYLE ET AL

It is certified that error appears in the above-identified patent and that said Letters Patent are hereby corrected as shown below:

Column 10, Claim 6, the right-hand side of the formula should read $$\overset{"}{\underset{CH_2-O-A-OH}{|}}{}^{"}$$

Signed and sealed this 23rd day of January 1973.

(SEAL)
Attest:

EDWARD M. FLETCHER, JR.
Attesting Officer

ROBERT GOTTSCHALK
Commissioner of Patents